T. B. JEBB.
SPECTACLE FRAME.
APPLICATION FILED APR. 19, 1921.

1,396,213.

Patented Nov. 8, 1921.

INVENTOR
T. B. Jebb.
BY J. Edward Maybee.
ATTY.

UNITED STATES PATENT OFFICE.

THOMAS B. JEBB, OF ORILLIA, ONTARIO, CANADA.

SPECTACLE-FRAME.

1,396,213.  Specification of Letters Patent.  Patented Nov. 8, 1921.

Application filed April 19, 1921. Serial No. 462,699.

*To all whom it may concern:*

Be it known that I, THOMAS B. JEBB, of the town of Orillia, in the county of Simcoe, Province of Ontario, Canada, a subject of the King of Great Britain, have invented certain new and useful Improvements in Spectacle-Frames, of which the following is a specification.

This invention relates particularly to frames for spectacles fitted with bifocal lenses. It is desirable that the centers of the lenses should be opposite the pupils of the eyes when any considerable use is being made of the long range portions of the bifocal lenses, while if long continued use is to be made of the short range portions of the lenses, it is desirable that the centers of these portions should be in line with the pupils. My object therefore is to provide a simple, neat and inexpensive attachment for a spectacle frame which may be quickly and easily adjusted to support the lenses in either of the positions referred to.

I attain my object by means of the constructions hereinafter described and illustrated in the accompanying drawings in which—

Figure 1:
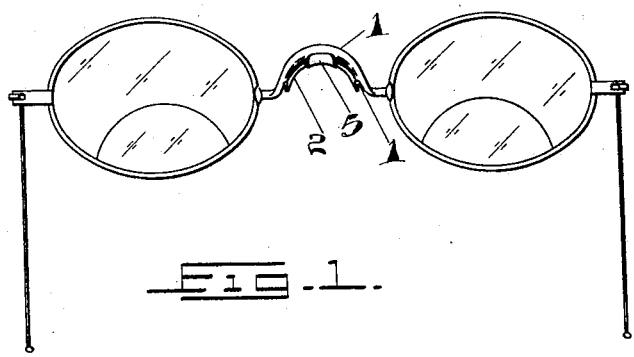
Figure 2:
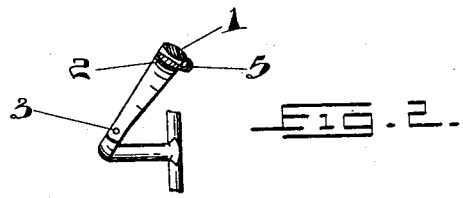
Figure 3:
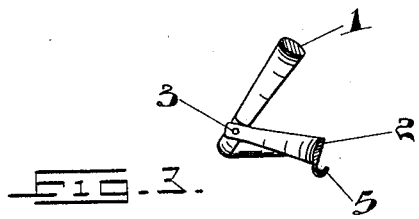
Figure 4:
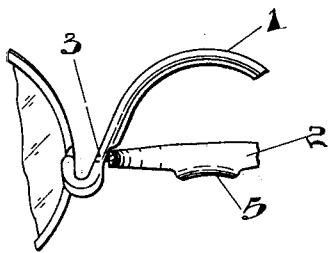

Figure 1 is a front elevation of a pair of spectacles provided with my improvements;

Fig. 2 a cross section through the bridges, showing the supplemental bridge in its raised position;

Fig. 3 a similar view showing the supplemental bridge in its lowered position; and Fig. 4 a rear elevation of parts of the bridges illustrating particularly the construction for retaining the supplemental bridge in its lowered position.

In the drawings like numerals of reference indicate corresponding parts in the different figures.

The spectacle frame in general may be of any ordinary construction and is provided with the usual bridge 1. 2 is a supplemental bridge, which is adapted to occupy either of two positions as hereinafter described and which is adapted to comfortably engage the nose in either of these positions. This supplemental bridge is arc-shape and its ends are provided with laterally extending pivots 3, which pivots are adapted to be received in holes formed in the bridge 1. This supplemental bridge is so proportioned relative to the main bridge that its ends tend to spring apart and thus exert a pressure against the inner surface of the ends of the bridge 1.

The engaging surfaces of the main bridge and supplemental bridge are so shaped that when the supplemental bridge is lowered as shown in Fig. 3, the bridge tends to remain in the lowered position, but by the exercise of a small amount of force may be pressed up to the position shown in Fig. 2.

The preferred arrangement for this purpose is to form a slight depression in the inner surface of the bridge 1 into which the ends of the supplemental bridge 2 spring as indicated in Figs. 3 and 4. The inner surface of the supplemental bridge is suitably curved and rounded to comfortably fit against the nose of the wearer when the supplemental bridge is in its raised position, and it is also provided with a supplemental nose rest 5 formed on or secured thereto and adapted to fit comfortably against the bridge of the wearer's nose while the supplemental bridge is in its lowered position and is also adapted to limit the upward movement of the supplemental bridge by its engagement with the bridge 1.

From the constructions described it follows that the supplemental bridge may occupy either of two positions and will rest comfortably against the nose in either position. When the bridge is in its raised position, the frame is scarcely distinguishable from an ordinary frame and the centers of the lenses are then substantially opposite the pupils of the eyes or in such position as is desirable if the wearer expects to make equal or greater use of the long range portions of the lenses than of the short range portions, while when the bridge 2 is in its lowered position, the short range portions of the lenses are brought in front of the pupils of the eyes. The spectacles are thus readily adapted to give the maximum of comfort in each of the two conditions of use.

What I claim as my invention is:

1. The combination with a spectacle frame provided with a bridge of a supplemental bridge piece having a laterally extending pivot at each of its ends, said frame bridge being provided with holes to receive said pivots, one of said bridges having a depression into which a part of the other bridge may spring to tend to retain the supplemental bridge in a lowered position relative to the frame bridge.

2. The combination with a spectacle frame provided with a bridge of a supplemental bridge piece having a laterally extending pivot at each of its ends, said frame bridge being provided with holes to receive said pivots, one of said bridges having a depression into which a part of the other bridge may spring to tend to retain the supplemental bridge in a lowered position relative to the frame bridge, said supplemental bridge having a supplemental nose rest formed thereon adapted to fit comfortably against the nose when the supplemental bridge is in its lowered position and to engage the frame bridge to limit the upward movement of the supplemental bridge when it is swung up from its lower position.

3. The combination with a spectacle frame provided with a bridge having a lateral hole adjacent each end and a depression across its inner face adjacent each hole of a supplemental bridge piece formed with pivot pins fitting into said holes, the supplemental bridge having its outer surfaces adjacent the ends adapted to spring into and out of said depressions.

4. The combination with a spectacle frame provided with a bridge of a supplemental bridge piece having a laterally extending pivot at each of its ends, said frame bridge being provided with holes to receive said pivots, the supplemental bridge also being so proportioned relative to the frame bridge that its ends tend to spring apart and thus exert a frictional pressure against said main bridge tending to prevent relative movement of the two bridges, one of said bridges having a depression into which a part of the other bridge may spring to retain the supplemental bridge in a lowered position relative to the frame bridge when the weight of the spectacle frame is supported by the supplemental bridge.

5. The combination with a spectacle frame provided with a bridge of a supplemental bridge piece pivotally connected with the frame bridge at each of its ends, one of said bridges having a depression into which a part of the other bridge may spring to retain the supplemental bridge in a lowered position relative to the frame bridge when the weight of the spectacle frame is supported by the supplemental bridge.

Signed at Orillia, Ontario, this 5th day of April, 1921.

THOMAS B. JEBB.